United States Patent Office.

RUDOLF LANGHANS, OF BERLIN, GERMANY.

PROCESS OF PRODUCING COATINGS COMPOSED OF EARTHY OXIDS.

SPECIFICATION forming part of Letters Patent No. 571,532, dated November 17, 1896.

Application filed November 29, 1895. Serial No. 570,552. (No specimens.)

*To all whom it may concern:*

Be it known that I, RUDOLF LANGHANS, of Berlin, Province of Brandenburg, Empire of Germany, have invented an Improvement in Processes of Producing Coatings Composed of Earthy Oxids, of which the following description is a specification.

This invention relates to the production of coatings composed of one or more oxids of earth or alkali-earth metals which will be somewhat porous and yet perfectly cohesive and adhesive of themselves; and it consists in a process for obtaining said coatings in a more advantageous manner than heretofore with the aid of electrolysis and subsequent calcination of the deposited earthy hydroxids.

The invention comprises, in the first place, the production of the coating, and, in the second place, the combination therewith of new means to impart perfect porousness to the same. The production of the coating is based on the fact I have recently discovered that under certain conditions aqueous solutions of the water-soluble or "meta" hydroxids of earth and alkali-earth metals, which have not yet been treated electrolytically, as far as I am aware, are well adapted for use as the electrolyte in the production of coatings composed of earthy oxids. I have found that on such electrolytes being subjected to the action of the electric current the said hydroxids behave in a totally different manner according to the degree of concentration of the aqueous solutions employed as electrolytes. If the solution is concentrated, it forms an electrolytical conductor which is so extremely efficacious that no deposit will be formed at all upon the negative electrode, whether the current density employed be high or low, owing to the violent evolution of hydrogen at said electrode, but if on the contrary a diluted solution is employed then a deposit of indissoluble hydroxid will be formed at once on the negative electrode, even when the current intensity brought into action is but a low one. The deposit thus produced constitutes a uniform layer which is perfectly cohesive and adhesive of itself and which allows of being subjected to conversion into oxids by calcination without losing those properties. The effect will be the same whether the solution is a simple or a compound solution, that is to say, prepared with one or more of the said water-soluble or meta hydroxids. Moreover, I have discovered the curious fact that organic bases, for instance opium, morphium, chinin, cinchonin, bases of the veratrin class, strychnin, brucin, piperin, bases of the pyridin class, &c., when employed as such, that is to say, not in the form of the salts they form with acids, are perfectly dissolved in the aqueous solutions of the water-soluble hydroxids of earth and alkali-earth metals without giving rise to any separation of indissoluble hydroxid, as would be the case when ammonia or an alkaline were added, and that by electrolyzing such a compound solution an intimate mixture of the indissoluble hydroxid or hydroxids and the organic base is deposited on the negative electrode, forming a uniform coating which is well cohesive and adhesive of itself. I make use of this new fact to impart porousness to the coating when required, as the organic base is completely destroyed by the subsequent calcination in the converting step without injuring the said properties of the coating.

The above-stated new facts I avail of for coating bodies or foundations of any shape with earthy oxids, where such coating is required or desirable, as, for instance, in manufacturing incandescent bodies for use with gas and other burners.

In order to produce the earthy coating, I proceed as follows:

I prepare a diluted aqueous solution of the selected meta or water-soluble earthy hydroxid, for instance the water-soluble hydroxid of thorium. In this solution as an electrolyte I dip the body to be coated, using the same as the negative electrode or cathode, in combination with an indissoluble or indifferent anode, (metals of the platinum group, gold, carbon, &c.,) and then I subject the solution to the action of a current, preferably of weak density, *i. e.*, small volume for surface to be coated, allowing the deposit to form upon the cathode with such thickness as is required or desired, whereupon the coated cathode is disconnected from the source of electricity, removed from the electrolytic bath, carefully dried, and finally calcined. The best results have been obtained by me up to the present time by using as the electrolyte a solution which contains about three per cent. of the selected water-soluble earthy hydroxid, for instance that of thorium, and treating the same with a current of which the density corresponds to about three amperes per one hundred square centimeters or 0.03 ampere per one square centimeter.

If the body to be coated is intended for use as an incandescent body for gas and other burners, consisting, for instance, of a cone-shaped mantle constructed of platinum-wire gauze or carbonized fiber or other substance having an electroconductive surface, the coating should be as porous as possible in addition to being cohesive and adhesive. In order to obtain this, I dissolve a sufficient quantity of one or more of the herein-described organic bases in the said aqueous solution of water-soluble earthy hydroxid or hydroxids previous to the electrolyzing step, so as to obtain by the latter a deposit composed of indissoluble hydroxid and organic base. After electrolyzation the coated body is removed from the bath, carefully dried, and, finally, calcined, whereby the organic base is totally destroyed, leaving a coating composed of pure oxid in a state of very perfect porousness, without the cohesion and adhesion of the thus-produced oxid coating being injured.

It is obvious that by varying the proportion of organic base added the degree of porousness of the coating can be varied.

Thorium hydroxid as precipitated by alkalies from a solution of a thorium salt is not soluble in water.

The soluble hydroxid can be prepared in the following manner: Oxid of thorium obtained by ignition of the oxalate is heated with excess of nitric or hydrochloric acid. When the excess of acid is expelled by heating in a water-bath, a residue is obtained which dissolves in water.

Other methods of obtaining porousness of the coating are described in a former application of mine bearing Serial No. 569,346, and those means may be employed instead of the addition of organic bases to the electrolytical bath; but I prefer the latter method, as I am enabled thereby, first, to dispense with the step of transforming the deposited hydroxids into salts capable of parting with the acid under the action of heat, and, secondly, to regulate the porousness at will.

Having fully described my invention, what I claim, and desire to secure by Letters Patent, is—

1. The herein-described process of producing coherent and firmly-adhesive porous coatings composed of one or more earthy oxids, which consists in electrolyzing a dilute aqueous solution of a metahydroxid of an earth or alkali-earth metal by an electric current of low density, depositing thereby upon an electroconductive foundation as the cathode a coating of hydroxid, and finally drying and calcining said deposit.

2. The herein-described process of producing coherent and firmly-adhesive porous coatings composed of one or more earthy oxids, which consists in immersing a reticulated electroconductive foundation in an electrolyte composed of a dilute aqueous solution of a metahydroxid of an earth or alkali-earth metal, passing an electric current of low density through said electrolyte and the foundation as the cathode, to thereby deposit upon the latter a coating of indissoluble hydroxid, and finally converting said hydroxid into an earthy oxid.

3. The herein-described process of producing coherent and firmly-adhesive porous coatings composed of one or more earthy oxids, which consists in electrolyzing a dilute aqueous solution of a metahydroxid of an earth or alkali-earth metal by an electric current of low density, depositing thereby upon a platinum-wire foundation forming the cathode a coating of earthy hydroxid, and finally drying said deposit and converting it by heat into an earthy oxid.

4. The herein-described process of producing coherent and firmly-adhesive porous coatings composed of one or more earthy oxids, which consists in subjecting to the action of an electric current of low density an electrolyte composed of a dilute aqueous solution of a meta earthy hydroxid and an organic base, depositing thereby a coating of earthy hydroxid and the organic base upon an electroconductive foundation immersed in the electrolyte and forming the cathode, and finally drying said deposit and calcining, to destroy the organic base and leave a porous coating of earthy oxid.

In testimony whereof I have hereunto set my hand in the presence of two subscribing witnesses.

RUDOLF LANGHANS.

Witnesses:
WM. HAUPT,
M. DAWS.